United States Patent
Lee et al.

(10) Patent No.: US 10,843,960 B2
(45) Date of Patent: Nov. 24, 2020

(54) FABRICATION METHOD OF STRENGTHENED GLASS AND FABRICATION METHOD OF DISPLAY DEVICE

(71) Applicant: SAMSUNG DISPLAY CO., LTD., Yongin-si (KR)

(72) Inventors: Hoikwan Lee, Anseong-si (KR); Eun-kyung Yeon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/146,845

(22) Filed: May 4, 2016

(65) Prior Publication Data

US 2017/0036941 A1 Feb. 9, 2017

(30) Foreign Application Priority Data

Aug. 7, 2015 (KR) .................. 10-2015-0111862

(51) Int. Cl.
| | |
|---|---|
| *C03C 15/00* | (2006.01) |
| *C03C 21/00* | (2006.01) |
| *C03B 23/023* | (2006.01) |
| *C03C 19/00* | (2006.01) |
| *B24B 1/00* | (2006.01) |

(52) U.S. Cl.
CPC .............. *C03C 15/00* (2013.01); *B24B 1/00* (2013.01); *C03B 23/023* (2013.01); *C03C 19/00* (2013.01); *C03C 21/002* (2013.01)

(58) Field of Classification Search
CPC ....... C03C 15/00; C03C 15/02; C03C 15/025; C03C 21/00–008
See application file for complete search history.

(56) References Cited

U.S. PATENT DOCUMENTS 3,779,732 A * 12/1973 Spanoudis ............ C03C 4/0071
65/116
4,911,743 A * 3/1990 Bagby ..................... C03B 27/00
65/30.13

(Continued)

FOREIGN PATENT DOCUMENTS

KR 10-2010-0076907 A 7/2010
KR 10-1268956 B1 5/2013

(Continued)

OTHER PUBLICATIONS

Abstract for Korean Publication No. 1020120117495, Oct. 24, 2012 for Korean Patent No. 10-1268956 B1, May 29, 2013, 3 Pages.

(Continued)

*Primary Examiner* — Erin Snelting
(74) *Attorney, Agent, or Firm* — Lewis Roca Rothgerber Christie LLP

(57) ABSTRACT

A method of fabricating strengthened glass includes strengthening a glass substrate to form a strengthened glass substrate including a first surface and a second surface opposite to the first surface, and slimming the strengthened glass substrate. The slimming may include slimming the first surface and not slimming the second surface, or slimming the first surface and the second surface differently from each other. Strengthened glass fabricated by this method of fabricating strengthened glass may be used in a bent display device.

5 Claims, 8 Drawing Sheets

(56) References Cited

U.S. PATENT DOCUMENTS

| | | | | |
|---|---|---|---|---|
| 5,456,372 | A * | 10/1995 | Solinov | B32B 17/10018 216/34 |
| 9,505,653 | B2 * | 11/2016 | Bookbinder | C03C 21/001 |
| 2009/0197048 | A1 * | 8/2009 | Amin | C03C 3/085 428/142 |
| 2010/0009154 | A1 * | 1/2010 | Allan | C03C 3/085 428/220 |
| 2011/0165393 | A1 * | 7/2011 | Bayne | C03C 15/02 428/215 |
| 2012/0075207 | A1 * | 3/2012 | Jang | G06F 3/044 345/173 |
| 2012/0196071 | A1 * | 8/2012 | Cornejo | B28D 1/00 428/43 |
| 2012/0329525 | A1 * | 12/2012 | Hashimoto | C03C 15/00 455/566 |
| 2013/0107370 | A1 * | 5/2013 | Lander | C03C 15/00 359/609 |
| 2014/0002975 | A1 * | 1/2014 | Lee | H05K 5/0017 361/679.01 |
| 2014/0104762 | A1 * | 4/2014 | Park | G06F 1/1652 361/679.01 |
| 2014/0111910 | A1 * | 4/2014 | Lin | G06F 1/1637 361/679.01 |
| 2014/0138009 | A1 * | 5/2014 | Lim | H01L 51/0097 156/60 |
| 2014/0139758 | A1 * | 5/2014 | Jian | G06F 3/0416 349/12 |
| 2014/0139984 | A1 * | 5/2014 | Jung | G06F 1/1637 361/679.01 |
| 2014/0140037 | A1 * | 5/2014 | Cho | F21V 9/14 362/19 |
| 2014/0162029 | A1 * | 6/2014 | Takeuchi | C03B 23/0235 428/174 |
| 2014/0167010 | A1 * | 6/2014 | Jung | H01L 51/5246 257/40 |
| 2014/0170388 | A1 * | 6/2014 | Kashima | C03C 15/00 428/157 |
| 2014/0340609 | A1 * | 11/2014 | Taylor | G02F 1/133308 349/58 |
| 2014/0366580 | A1 | 12/2014 | Hung et al. | |
| 2015/0166406 | A1 * | 6/2015 | Ishimaru | C03C 15/00 428/192 |
| 2015/0210588 | A1 * | 7/2015 | Chang | C03C 21/002 361/750 |
| 2015/0267402 | A1 * | 9/2015 | Borrelli | E04B 1/84 181/290 |
| 2016/0137550 | A1 * | 5/2016 | Murata | C03B 23/03 428/141 |
| 2016/0224069 | A1 * | 8/2016 | Chang | C03C 21/002 |
| 2016/0236975 | A1 * | 8/2016 | Sugimoto | C03C 3/083 |
| 2016/0326050 | A1 * | 11/2016 | Lee | C03C 21/002 |
| 2017/0183258 | A1 * | 6/2017 | Ottermann | B65D 85/48 |

FOREIGN PATENT DOCUMENTS

| | | | | |
|---|---|---|---|---|
| KR | 10-1328893 B1 | | 11/2013 | |
| WO | WO 2013/032302 | * | 3/2013 | G06F 3/041 |

OTHER PUBLICATIONS

Tandon, Rajan et al., Controlling the Fragmentation Behavior of Stressed Glass, Ceramic Materials Department, 2005, pp. 77-91, Sandia National Laboratories, Albuquerque, NM.

* cited by examiner

FABRICATION METHOD OF STRENGTHENED GLASS AND FABRICATION METHOD OF DISPLAY DEVICE

CROSS-REFERENCE TO RELATED APPLICATION

This U.S. non-provisional patent application claims priority to and the benefit of Korean Patent Application No. 10-2015-0111862, filed on Aug. 7, 2015, the entire content of which is hereby incorporated by reference.

BACKGROUND

1. Field

The present disclosure herein relates to fabrication methods of strengthened glass and fabrication methods of display devices, and more particularly, to fabrication methods of strengthened glass which may reduce the occurrence of shattering and cracks during bending and fabrication methods of display devices.

2. Description of the Related Art

In general, a glass substrate is provided on a display panel or a touch screen panel. Recently, interests in thin display devices have emerged, and, accordingly, research into providing a glass substrate having a set or predetermined strength as well as a small thickness has been actively conducted.

SUMMARY

Aspects of embodiments of the present disclosure are directed toward a method of fabricating strengthened glass which may reduce the occurrence of shattering and cracks during bending.

Aspects of embodiments of the present disclosure also are directed toward a method of fabricating a display device which may reduce the occurrence of shattering and cracks during bending.

An embodiment of the present disclosure provides a method of fabricating strengthened glass including: strengthening a glass substrate to form a strengthened glass substrate including a first surface and a second surface opposite to the first surface, and slimming the strengthened glass substrate. The slimming may include slimming the first surface and not slimming the second surface, or slimming the first surface and the second surface differently from each other.

In an embodiment, the slimming may be performed by mechanical polishing or chemical polishing.

In an embodiment, the mechanical polishing may be performed by a polishing method.

In an embodiment, the chemical polishing may be performed by providing hydrogen fluoride (HF).

In an embodiment, the strengthening may be performed by a chemical strengthening method.

In an embodiment, the strengthening may be performed by providing a heat of approximately (or about) 360° C. to approximately (or about) 430° C.

In an embodiment, in the slimming, the first surface may be slimmed to have a compressive stress of approximately (or about) 100 MPa to approximately (or about) 700 MPa.

In an embodiment, in the slimming, the second surface may not be slimmed or may be slimmed differently from the first surface to have a compressive stress of approximately (or about) 700 MPa to approximately (or about) 1,000 MPa.

In an embodiment, after the slimming the strengthened glass substrate, the first surface may have a first compressive stress and the second surface may have a second compressive stress greater than the first compressive stress.

In an embodiment of the present disclosure, a method of fabricating a display device includes providing strengthened glass and providing a display panel. The providing of the strengthened glass includes strengthening a glass substrate to form a strengthened glass substrate, and slimming a first surface of the strengthened glass substrate and not slimming a second surface of the strengthened glass substrate opposite to the first surface, or slimming the first surface and the second surface differently from each other. The providing of the display panel may include providing the display panel to be closer to the first surface than the second surface.

In an embodiment, the method of fabricating a display device may further include bending the strengthened glass and the display panel. In the bending, the first surface may have a first radius of curvature, and the second surface may have a second radius of curvature greater than the first radius of curvature.

In an embodiment, the method of fabricating a display device may further include providing a touch screen panel to be closer to the first surface than the second surface. The display panel may be provided between the strengthened glass and the touch screen panel.

In an embodiment, the method of fabricating a display device may further include bending the strengthened glass, the display panel, and the touch screen panel. In the bending, the first surface may have a first radius of curvature, and the second surface may have a second radius of curvature greater than the first radius of curvature.

In an embodiment, in the slimming, the first surface may be slimmed to have a compressive stress of approximately (or about) 100 MPa to approximately (or about) 700 MPa.

In an embodiment, in the slimming, the second surface may not be slimmed or may be slimmed differently from the first surface to have a compressive stress of approximately (or about) 700 MPa to approximately (or about) 1,000 MPa.

In an embodiment, the slimming may be performed by mechanical polishing or chemical polishing.

In an embodiment, the strengthening may be performed by a chemical strengthening method.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
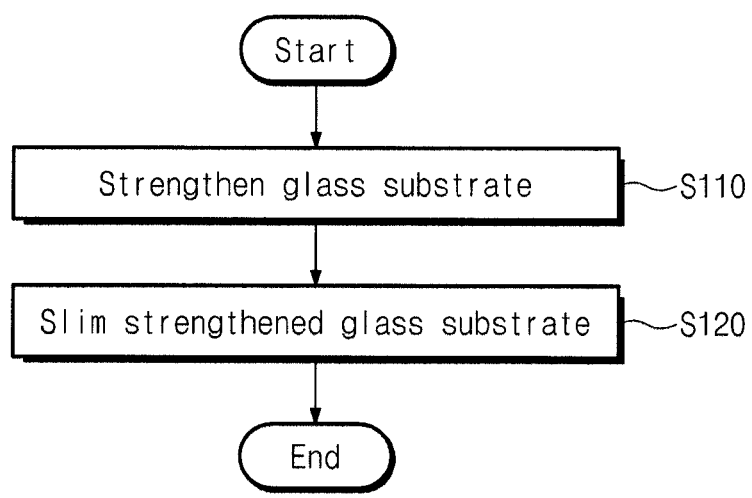
FIG. 1 is a flowchart schematically illustrating a method of fabricating strengthened glass according to an embodiment of the present disclosure.

The foregoing and other objects, features and advantages of the present disclosure will become more readily apparent from the following detailed description of embodiments of the present disclosure that proceeds with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art.

In the drawings, like reference numerals refer to like elements throughout. In the accompanying drawings, the dimensions of structures are exaggerated for clarity. It will be understood that although the terms first and second are used herein to describe various elements, these elements should not be limited by these terms. These terms are only used to distinguish one element from another element. For example, a first element could be termed a second element, and, similarly, a second element could be termed a first element, without departing from the scope of the inventive concept. The terms of a singular form may include plural forms unless referred to the contrary.

The meaning of "include," "comprise," "including," or "comprising," specifies a property, a fixed number, a task, a process, an element, a component, or a combination thereof but does not exclude other properties, fixed numbers, tasks, processes, elements, components, or combinations thereof. Also, it will be understood that when an element such as a layer, surface, or substrate is referred to as being "on" another element, it can be directly on the other element or intervening elements may also be present therebetween.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinafter, a method of fabricating strengthened glass according to an embodiment of the present disclosure will be described.

FIG. 1 is a flowchart schematically illustrating a method of fabricating strengthened glass according to an embodiment of the present disclosure.

Referring to FIG. 1, the method of fabricating strengthened glass according to one embodiment of the present disclosure includes the tasks of: strengthening a glass substrate (100 of FIG. 3A) (S110) and slimming the strengthened glass substrate (200 of FIG. 3B) (S120). The slimming task S120 may include slimming a first surface (210 of FIG. 3B) of the strengthened glass substrate (200 of FIG. 3B) and not slimming a second surface (220 of FIG. 3B) of the strengthened glass substrate (200 of FIG. 3B) opposite to the first surface (210 of FIG. 3B), or may include slimming the first surface (210 of FIG. 3B) and the second surface (220 of FIG. 3B) differently from each other. When slimming the strengthened glass substrate (200 of FIG. 3B), strengthened glass (GL of FIG. 3C) may be obtained.

The strengthening task S110 may be performed by a chemical strengthening method. The strengthening task S110, for example, may strengthen the glass substrate (100 of FIG. 3A) by a chemical strengthening method in which $Na^+$ ions included in the glass substrate (100 of FIG. 3A) are removed and $K^+$ ions are injected therein.

In the strengthening task S110, a surface (e.g., the first surface 210, the second surface 220, or portions or combinations thereof) of the strengthened glass substrate (200 of FIG. 3B) may have compressive stress and the inside of the strengthened glass substrate (200 of FIG. 3B) may have tensile stress. For example, $Na^+$ ions included in the glass substrate (100 of FIG. 3A) may be removed through a surface of the glass substrate (100 of FIG. 3A), and $K^+$ ions may be injected therein. When the $Na^+$ ions are removed through the surface of the glass substrate (100 of FIG. 3A), the glass substrate (100 of FIG. 3A) may expand, the surface of the glass substrate (100 of FIG. 3A) may shrink to be subjected to compressive stress after the $K^+$ ions are injected therein, and the inside of the glass substrate (100 of FIG. 3A) may be subjected to tensile stress.

The strengthening task S110 may be performed by providing a heat of approximately (or about) 360° C. to approximately (or about) 430° C. The strengthening task S110 may be performed by providing a heat of approximately (or about) 360° C. to approximately (or about) 430° C. for greater than about 0 hour and less than about 8 hours. When a heat of less than approximately (or about) 360° C. is provided, an ion exchange reaction of the glass substrate (100 of FIG. 3A) does not proceed, and when a heat of greater than 430° C. is provided, the strengthening of the glass substrate (100 of FIG. 3A) is excessively performed, and a phenomenon occurs in which the compressive stress of the surface of the glass substrate (100 of FIG. 3A) is reduced or weakened instead of being strengthened.

In the slimming task S120, the glass substrate (100 of FIG. 3A) may be thinned by slimming the first surface (210 of FIG. 3B) of the strengthened glass substrate (200 of FIG. 36). In the slimming task S120, the first surface (210 of FIG. 3B) of the strengthened glass substrate (200 of FIG. 3B) may be slimmed and the second surface (220 of FIG. 3B) of the strengthened glass substrate (200 of FIG. 3B) may not be slimmed, or the first surface (210 of FIG. 3B) of the strengthened glass substrate (200 of FIG. 3B) and the second surface (220 of FIG. 3B) of the strengthened glass substrate (200 of FIG. 3B) may be slimmed differently from each other.

As described above, when slimming the strengthened glass substrate (200 of FIG. 3B), the strengthened glass (GL of FIG. 3C) may be obtained. Compressive stress of a first surface (GS1 of FIG. 3C) of the strengthened glass (GL of FIG. 3C) and compressive stress of a second surface (GS2 of FIG. 3C) of the strengthened glass (GL of FIG. 3C) may be made differently by slimming the strengthened glass substrate (200 of FIG. 3B).

The first surface (GS1 of FIG. 3C) of the strengthened glass (GL of FIG. 3C) may have a compressive stress of approximately (or about) 100 MPa to approximately (or about) 700 MPa. In a case in which the compressive stress of the first surface (GS1 of FIG. 3O) of the strengthened glass (GL of FIG. 3C) is less than approximately (or about) 100 MPa, when the first surface (GS1 of FIG. 3C) of the strengthened glass (GL of FIG. 3C) is bent, the strengthened glass (GL of FIG. 3C) may not have sufficient strength and/or durability to withstand the external force caused by the bending. In a case in which the compressive stress of the first surface (GS1 of FIG. 3C) of the strengthened glass (GL of FIG. 3C) is greater than approximately (or about) 700 MPa, shattering or cracks may occur when the first surface (GS1 of FIG. 3C) of the strengthened glass (GL of FIG. 3C) is bent.

The second surface (GS2 of FIG. 3C) of the strengthened glass (GL of FIG. 3C) may have a compressive stress of approximately (or about) 700 MPa to approximately (or about) 1,000 MPa. In a case in which the compressive stress of the second surface (GS2 of FIG. 3C) of the strengthened glass (GL of FIG. 3C) is less than approximately (or about) 700 MPa, when the second surface (GS2 of FIG. 3C) of the strengthened glass (GL of FIG. 3C) is bent, the strengthened glass (GL of FIG. 3C) may not have sufficient strength and/or durability to withstand the external force caused by the bending. In a case in which the compressive stress of the second surface (GS2 of FIG. 3C) of the strengthened glass (GL of FIG. 3C) is greater than approximately (or about) 1,000 MPa, shattering or cracks may occur when the second surface (GS2 of FIG. 3C) of the strengthened glass (GL of FIG. 3C) is bent.

When the first surface (GS1 of FIG. 3C) has a smaller radius of curvature than the second surface (GS2 of FIG. 3C) by bending the strengthened glass (GL of FIG. 3C), the first surface (GS1 of FIG. 3C) is subjected to compressive stress and the second surface (GS2 of FIG. 3C) is subjected to tensile stress. The compressive stress present on the second surface (GS2 of FIG. 3C) may be reduced or relieved by the tensile stress caused by the bending, and accordingly, the occurrence of shattering or cracks due to the bending may not be an issue for the second surface (GS2 of FIG. 3C). However, the first surface (GS1 of FIG. 3C) may be simultaneously subjected to the compressive stress present on the first surface (GS1 of FIG. 3C) and the compressive stress caused by the bending, and accordingly, the occurrence of the shattering or cracks due to the bending may be an issue for the first surface (GS1 of FIG. 3C). The method of fabricating strengthened glass according to the embodiment of the present disclosure may reduce the occurrence of the shattering or cracks in the first surface (GS1 of FIG. 3C) due to the bending by reducing the compressive stress of the first surface (GS1 of FIG. 3C) of the strengthened glass (GL of FIG. 3C).

The slimming task S120, for example, may be performed by mechanical polishing or chemical polishing. The mechanical polishing may be performed by a polishing method. The chemical polishing may be performed by using an etchant. For example, the chemical polishing may be performed by providing hydrogen fluoride (HF) to the strengthened glass substrate (200 of FIG. 3B).

Figure 3A:
FIGS. 3A to 3F are cross-sectional views sequentially illustrating a method of fabricating a display device according to an embodiment of the present disclosure.
Figure 3B:
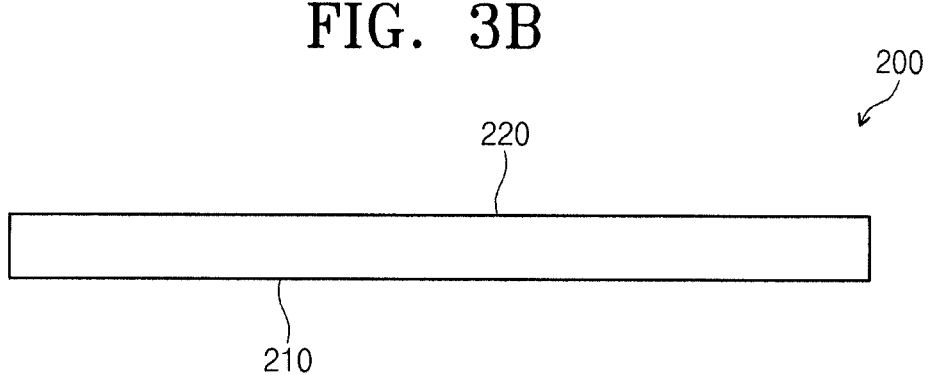
Figure 3C:
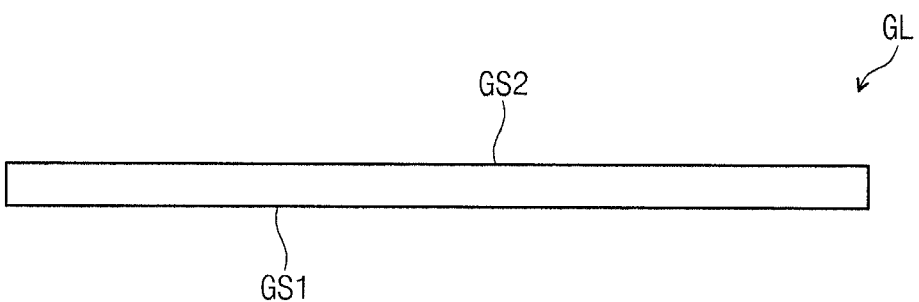

The method of fabricating the strengthened glass (GL of FIG. 3C) according to an embodiment of the present disclosure may further include the task of washing the strengthened glass (GL of FIG. 3C). In the washing task, foreign matter, contaminants, and/or glass particles on the first surface (GS1 of FIG. 3C) of the strengthened glass (GL of FIG. 3C) may be removed. In the washing task, foreign matter, contaminants, and/or glass particles on the second surface (GS2 of FIG. 3C) of the strengthened glass (GL of FIG. 3C) may be removed.

A typical related art method of fabricating strengthened glass does not include both the tasks of: strengthening a glass substrate and slimming the glass substrate. In a case in which only the strengthening task was included, shattering or cracks occurred when bending the strengthened glass substrate due to compressive stress on the surface of the glass substrate that was generated during the strengthening of the glass substrate. Also, since the slimming task was not included, it was difficult to provide a thin glass substrate. Furthermore, in a case in which only the slimming task was included, since the glass substrate was not strengthened, shattering or cracks of the glass substrate occurred in the slimming task or during bending.

Since the method of fabricating strengthened glass according to one embodiment of the present disclosure may include both the strengthening task and the slimming task of the glass substrate, the method may provide a display device including a thin glass substrate which may prevent the occurrence of shattering and/or cracks during bending.

Hereinafter, a method of fabricating a display device according to an embodiment of the present disclosure will be described. Hereinafter, points different from the above-described method of fabricating strengthened glass according to the embodiment of the present disclosure will be mainly described in more detail, and undescribed parts will be appreciated by referring to the above-described method of fabricating strengthened glass according to the embodiment of the present disclosure.

Figure 2:
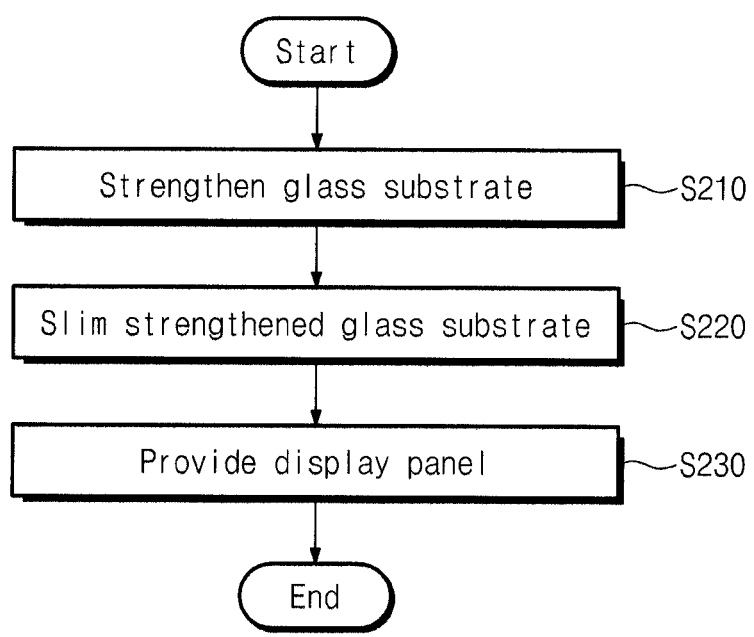
FIG. 2 is a flowchart schematically illustrating a method of fabricating a display device according to an embodiment of the present disclosure.

FIG. 2 is a flowchart schematically illustrating a method of fabricating a display device according to an embodiment of the present disclosure. FIGS. 3A to 3F are cross-sectional views sequentially illustrating the method of fabricating a display device according to an embodiment of the present disclosure.

Referring to FIGS. 2 and 3A to 3F, the method of fabricating a display device according to the embodiment of the present disclosure includes the tasks of: providing strengthened glass including strengthening a glass substrate (S210) and slimming the strengthened glass substrate (S220), and providing a display panel (S230). The slimming task S220 may include slimming a first surface 210 of a strengthened glass substrate 200 and not slimming a second surface 220 of the strengthened glass substrate 200 opposite to the first surface 210, or may include slimming the first surface 210 and the second surface 220 differently from each other. When slimming the strengthened glass substrate 200, strengthened glass GL may be obtained.

Referring to FIGS. 2, 3A, and 3B, a glass substrate 100 is prepared. The glass substrate 100 is strengthened (S210). The strengthening task S210 may be performed by a chemical strengthening method. The strengthening task S210, for example, may strengthen the glass substrate 100 by a chemical strengthening method in which $Na^+$ ions included in the glass substrate 100 are removed and $K^+$ ions are injected therein.

In the strengthening task S210, one or more surfaces (or portions thereof) of the strengthened glass substrate 200 may have compressive stress and the inside of the strengthened glass substrate 200 may have tensile stress. For example, $Na^+$ ions included in the glass substrate 100 are removed through a surface of the glass substrate 100, and $K^+$ ions are injected therein. When the $Na^+$ ions are removed through the surface of the glass substrate 100, the glass substrate 100 may expand, the surface of the glass substrate 100 may shrink to be subjected to compressive stress after the $K^+$ ions are injected therein, and the inside of the glass substrate 100 may be subjected to tensile stress.

The strengthening task S210 may be performed by providing a heat of approximately (or about) 360° C. to approximately (or about) 430° C. The strengthening task S210 may be performed by providing a heat of approximately (or about) 360° C. to approximately (or about) 430° C. for greater than approximately (or about) 0 hour and less than approximately (or about) 8 hours. When a heat of less than approximately (or about) 360° C. is provided, an ion exchange reaction of the glass substrate 100 may not proceed, and when a heat of greater than 430° C. is provided, the strengthening of the glass substrate 100 may be excessively performed, and a phenomenon may occur in which the compressive stress of the surface of the glass substrate 100 is reduced or weakened instead of being strengthened. Referring to FIGS. 2, 3B, and 3C, the strengthened glass substrate 200 is slimmed (S220). In the slimming task S220, the glass substrate (100 of FIG. 3A) may be thinned by slimming the first surface 210 of the strengthened glass substrate 200. In the slimming task S220, the first surface 210 of the strengthened glass substrate 200 may be slimmed and the second surface 220 of the strengthened glass substrate 200 may not be slimmed, or the first surface 210 of the strengthened glass substrate 200 and the second surface 220 of the strengthened glass substrate 200 may be differently slimmed from each other.

As described above, when slimming the strengthened glass substrate (200 of FIG. 3B), the strengthened glass (GL of FIG. 3C) may be obtained. Compressive stress of a first surface (GS1 of FIG. 3C) of the strengthened glass (GL of FIG. 3C) and compressive stress of a second surface (GS2 of FIG. 3C) of the strengthened glass (GL of FIG. 3C) may be made differently by slimming the strengthened glass substrate (200 of FIG. 3B).

The first surface GS1 of the strengthened glass GL may have a compressive stress of approximately (or about) 100 MPa to approximately (or about) 700 MPa. In a case in which the compressive stress of the first surface GS1 of the strengthened glass GL is less than approximately (or about) 100 MPa, when the first surface GS1 of the strengthened glass GL is bent, the strengthened glass GL may not have sufficient strength and/or durability to withstand the external force caused by the bending. In a case in which the compressive stress of the first surface GS1 of the strengthened glass GL is greater than approximately (or about) 700 MPa, shattering or cracks may occur when the first surface GS1 of the strengthened glass GL is bent.

The second surface GS2 of the strengthened glass GL may have a compressive stress of approximately (or about) 700 MPa to approximately (or about) 1,000 MPa. In a case in which the compressive stress of the second surface GS2 of the strengthened glass GL is less than approximately (or about) 700 MPa, when the second surface GS2 of the strengthened glass GL is bent, the strengthened glass GL may not have sufficient strength and/or durability to withstand the external force caused by the bending. In a case in which the compressive stress of the second surface GS2 of the strengthened glass GL is greater than approximately (or about) 1,000 MPa, shattering or cracks may occur when the second surface GS2 of the strengthened glass GL is bent.

When the first surface GS1 has a smaller radius of curvature than the second surface GS2 by bending the strengthened glass GL, the first surface GS1 is subjected to compressive stress and the second surface GS2 is subjected to tensile stress. The compressive stress present on the second surface GS2 may be reduced or relieved by the tensile stress caused by the bending, and accordingly, the occurrence of the shattering or cracks due to the bending may not be an issue for the second surface GS2. However, the first surface GS1 may be subjected to both the compressive stress present on the first surface GS1 and the compressive stress caused by the bending, and accordingly, the occurrence of the shattering or cracks due to the bending may be an issue for the first surface GS1. For example, although the compressive stress of the second surface GS2 caused by the strengthening task may be reduced or relieved by the tensile stress applied to the second surface GS2 due to the bending, the compressive stress of the first surface GS1 caused by the strengthening task may be increased by the compressive stress applied to the first surface GS1 due to the bending and the tensile stress generated in the glass in the strengthening task may be an energy source for the occurrence of fine shattering or fine cracks, and thus, the occurrence of the shattering or cracks due to the bending may be amplified. That is, the compressive stress present on the second surface GS2 may be reduced by the tensile stress caused by bending, but the compressive stress present on the first surface GS1 may be increased by the compressive stress caused by bending. The method of fabricating a display device according to an embodiment of the present disclosure may reduce the occurrence of the shattering or cracks in the first surface GS1 due to the bending by reducing the compressive stress of the first surface GS1 of the strengthened glass GL (e.g., the first surface GS1 of the strengthened glass GL may be slimmed such that the compressive stress on the first surface GS1 is less than the compressive stress on the second surface GS2).

The slimming task S220, for example, may be performed by mechanical polishing or chemical polishing. The mechanical polishing may be performed by a polishing method. The chemical polishing may be performed by using an etchant. For example, the chemical polishing may be performed by providing hydrogen fluoride (HF) to the strengthened glass substrate 200.

Figure 3D:
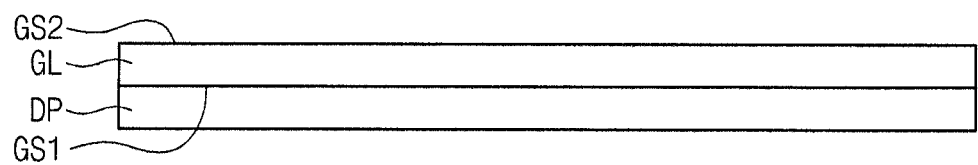
Figure 3E:
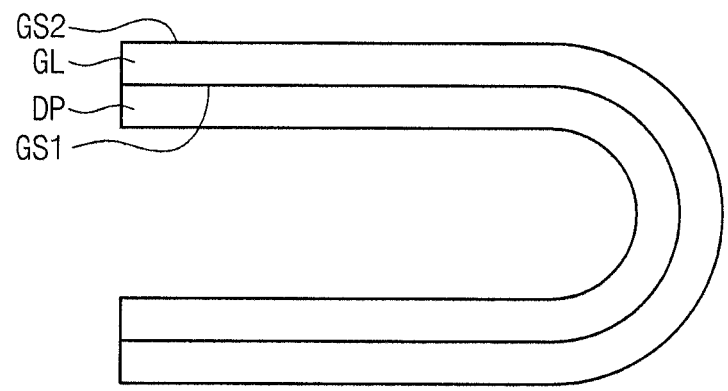
Figure 4A:
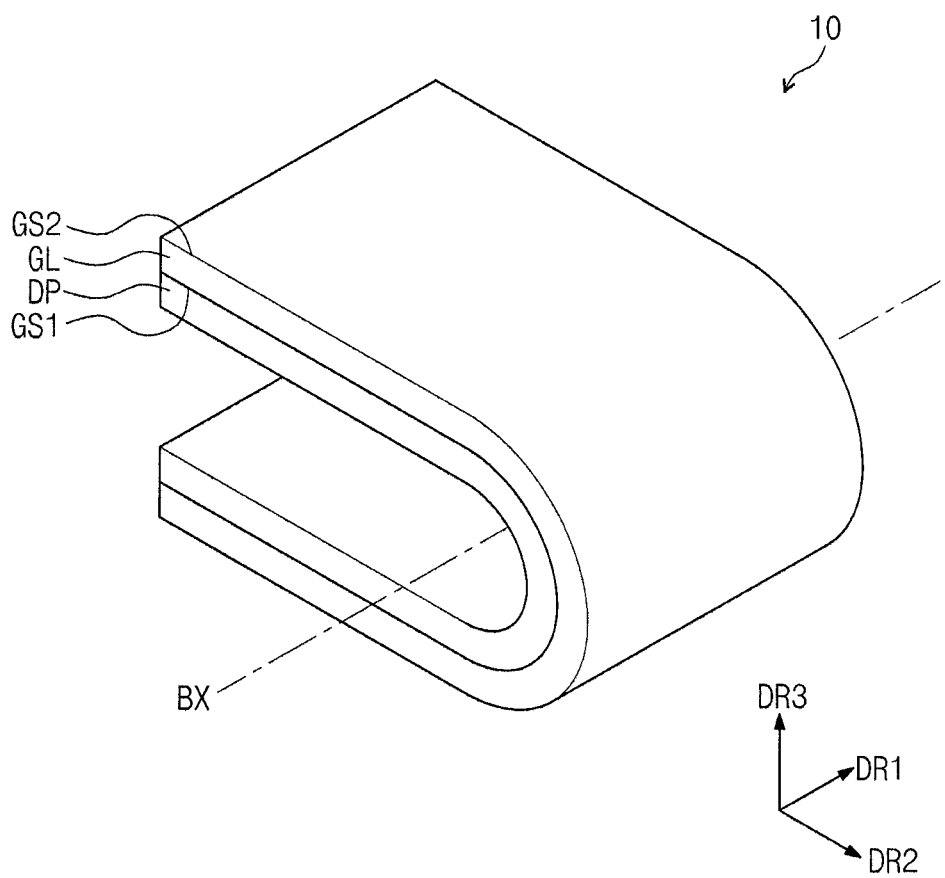
FIG. 4A is a schematic perspective view illustrating a display device fabricated by the method of fabricating a display device according to an embodiment of the present disclosure.

Referring to FIGS. 2 and 3D, a display panel DP is provided to be closer or more proximate (e.g., adjacent) to the first surface GS1 of the strengthened glass GL than the second surface GS2 of the strengthened glass GL. The display panel DP may be bent about a bending axis BX (FIG. 4A). The display panel DP, for example, may be an organic light emitting display panel, a liquid crystal display panel, a plasma display panel, an electrophoretic display panel, a microelectromechanical system (MEMS) display panel, and/or an electrowetting display panel.

The display panel DP may be flexible. The expression "flexible" as used herein denotes characteristics capable of being bent, and may include from a completely foldable structure to a structure that may be bent to only a few nanometers.

Figure 4B:
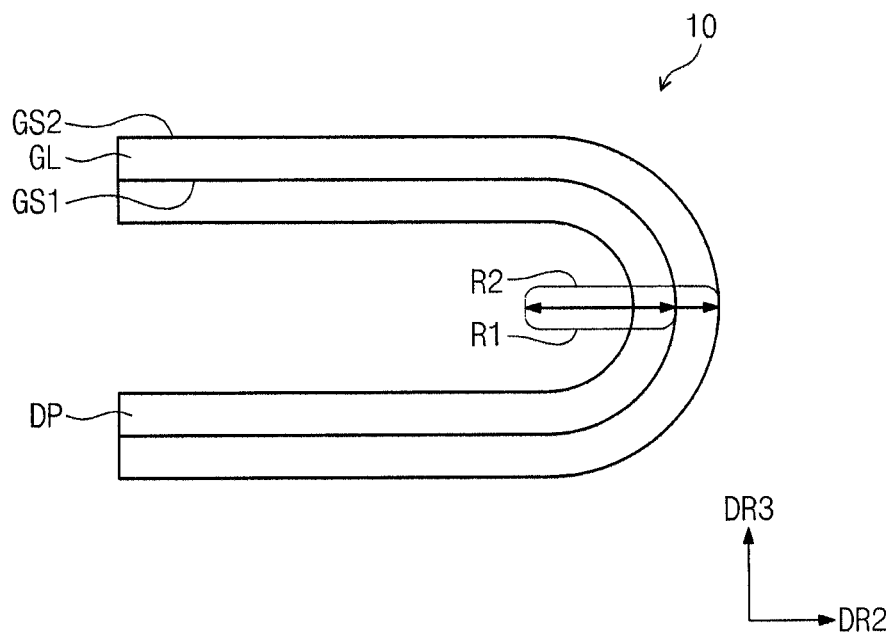
FIG. 4B is a schematic cross-sectional view illustrating a display device fabricated by the method of fabricating a display device according to an embodiment of the present disclosure.
Figure 4C:
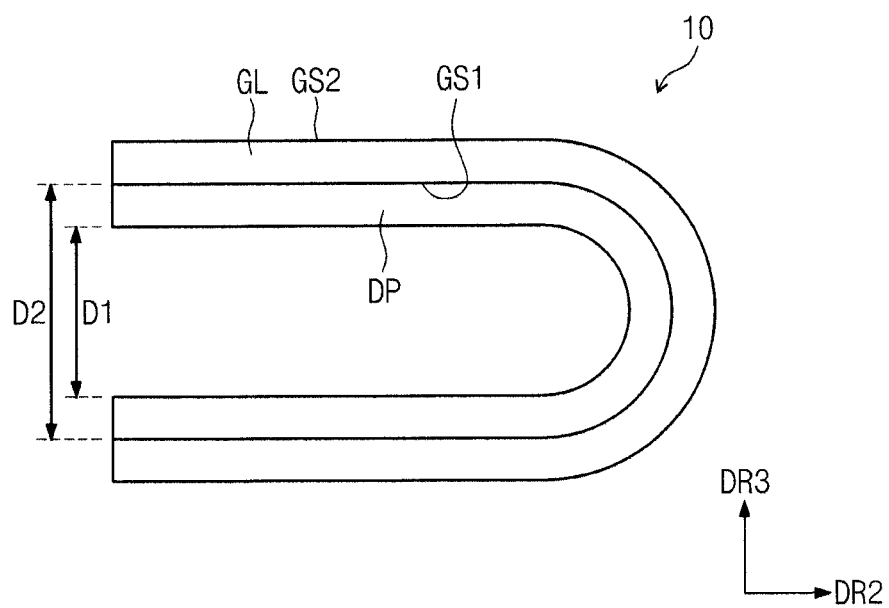
FIG. 4C is a schematic cross-sectional view illustrating a display device fabricated by the method of fabricating a display device according to an embodiment of the present disclosure.

FIG. 4A is a schematic perspective view illustrating a display device fabricated by the method of fabricating a display device according to an embodiment of the present disclosure. FIG. 4B is a schematic cross-sectional view illustrating a display device fabricated by the method of fabricating a display device according to an embodiment of the present disclosure. FIG. 4C is a schematic cross-sectional view illustrating a display device fabricated by the method of fabricating a display device according to an embodiment of the present disclosure.

Referring to FIGS. 2, 3E, and 4A to 4C, the method of fabricating a display device according to an embodiment of the present disclosure may further include the task of bending in which the strengthened glass GL and the display panel DP are bent. The expression "bending" as used herein may denote that an object is bent to a specific shape by an external force.

In the bending task, the bent display panel DP may be provided after bending the strengthened glass GL, or the display panel DP may be provided to be more proximate (e.g., adjacent) to the first surface GS1 of the strengthened glass GL than the second surface GS2 of the strengthened glass GL and the strengthened glass GL and the display panel DP may then be simultaneously or concurrently bent.

The bending task may be performed about the bending axis BX (FIG. 4A). The bending axis BX may extend in a first direction DR1 which crosses a second direction DR2 and is perpendicular to a third direction DR3. A display device 10 may be driven or operated in a first mode or a second mode, the display device 10 may be bent in the first mode, and the bend of the display device 10 may be unfolded in the second mode. In one or more embodiments, a radius of curvature of the display panel DP may be greater than a radius of curvature of the strengthened glass GL.

In FIGS. 4A, 4B, and 4C, although it has been illustrated as an example that a distance between areas or portions of the strengthened glass GL bent to face each other is constant when the display device 10 is bent about the bending axis BX, the embodiment of the present disclosure is not limited thereto and the distance between the areas or portions of the strengthened glass GL bent to face each other may not be constant. Also, in FIGS. 4A, 4B, and 4C, although it has been illustrated as an example that areas or portions of the strengthened glass GL bent to face each other are the same when the display device 10 is bent about the bending axis BX, the embodiment of the present disclosure is not limited thereto and the areas or portions of the strengthened glass GL bent to face each other may be different.

As illustrated in FIG. 4C, a distance D2 along the third direction DR3 between the areas or portions of the strengthened glass GL bent to face each (e.g., when the display device 10 is bent about the bending axis BX) may be greater than a distance D1 along the third direction DR3 between the areas or portions of the display panel DP bent to face each other.

In the bending task, when the strengthened glass GL is bent, the first surface GS1 of the strengthened glass GL may have a first radius of curvature (R1 of FIG. 4B). The second surface GS2 of the strengthened glass GL may have a second radius of curvature (R2 of FIG. 4B). The second radius of curvature R2 may be greater than the first radius of curvature R1. Accordingly, when the strengthened glass GL is bent in the bending task, the first surface GS1 of the strengthened glass GL may be subjected to compressive stress and the second surface GS2 of the strengthened glass GL may be subjected to tensile stress.

Figure 5:
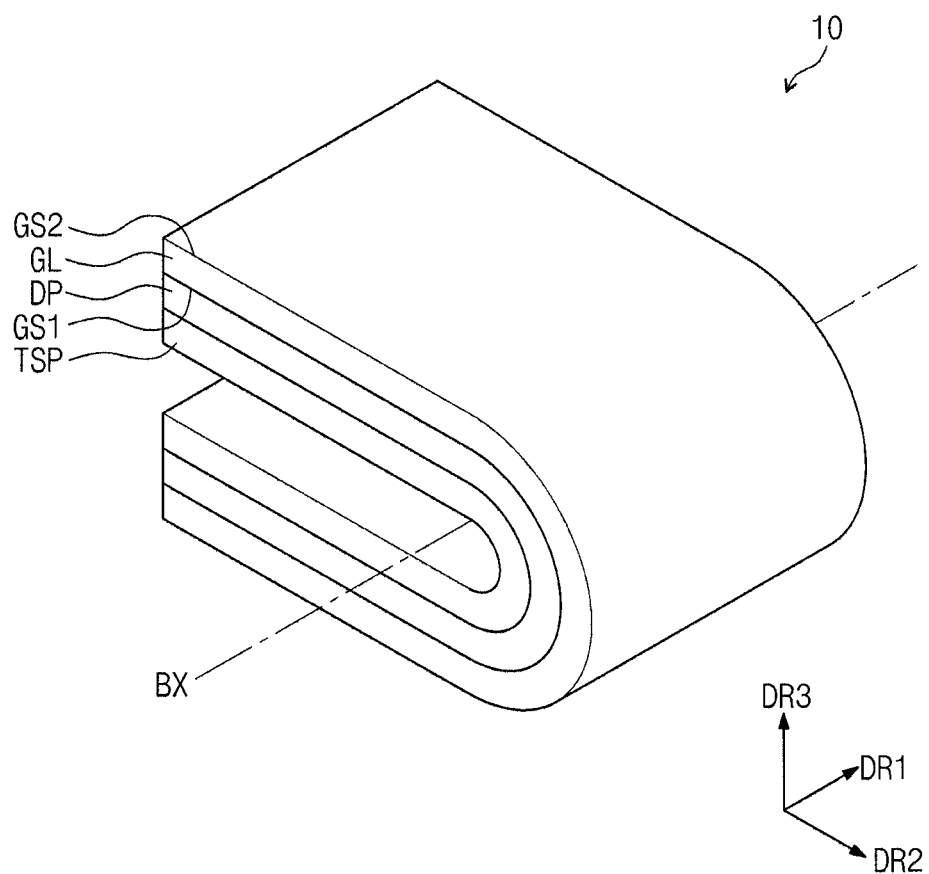
FIG. 5 is a schematic perspective view illustrating a display device fabricated by the method of fabricating a display device according to an embodiment of the present disclosure.

FIG. 5 is a schematic perspective view illustrating a display device fabricated by the method of fabricating a display device according to an embodiment of the present disclosure.

Figure 3F:
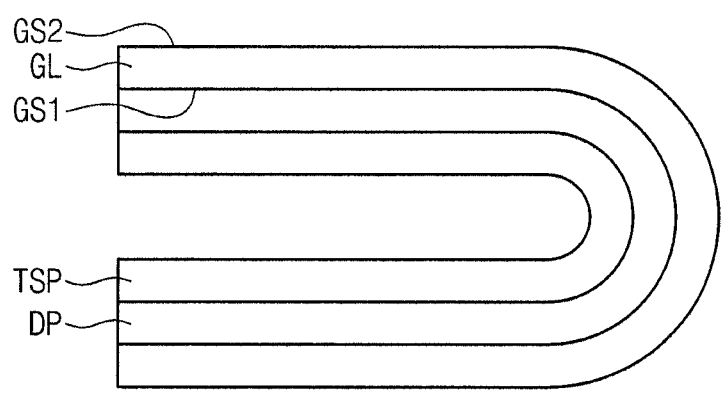

Referring to FIGS. 2, 3F, and 5, the method of fabricating a display device according to the embodiment of the present disclosure may further include the task of providing a touch screen panel TSP to be closer or more proximate (e.g., adjacent) to the first surface GS1 of the strengthened glass GL than the second surface GS2 of the strengthened glass GL. The display panel DP may be provided between the glass substrate 100 and the touch screen panel TSP. The touch screen panel TSP may sense a direct touch of the user or object, or an indirect touch.

The method of fabricating a display device according to an embodiment of the present disclosure may further include the task of bending in which the strengthened glass GL, the display panel DP, and the touch screen panel TSP are bent. For example, the touch screen panel TSP may be bent about the bending axis BX extending in the first direction DR1 which crosses the second direction DR2 and is perpendicular to the third direction DR3.

In the bending task, when the strengthened glass GL is bent, the first surface GS1 of the strengthened glass GL may have a first radius of curvature (R1 of FIG. 4B). The second surface GS2 of the strengthened glass GL may have a second radius of curvature (R2 of FIG. 4B). The second radius of curvature (R2 of FIG. 4B) may be greater than the first radius of curvature (R1 of FIG. 46).

In the bending task, after bending the strengthened glass GL, the bent display panel DP may be provided and then the bent touch screen panel TSP may be provided; or the display panel DP and the touch screen panel TSP may be provided to be closer or more proximate (e.g., adjacent) to the first surface GS1 of the strengthened glass GL than to the second surface GS2 of the strengthened glass GL and the strengthened glass GL, the display panel DP; and the touch screen panel TSP may then be simultaneously or concurrently bent.

The method of fabricating a display device according to an embodiment of the present disclosure may further include the task of washing the strengthened glass GL. In the washing task, foreign matter, contaminants, and/or glass particles on the first surface GS1 of the strengthened glass GL may be removed. In the washing task, foreign matter, contaminants, and/or glass particles on the second surface GS2 of the strengthened glass GL may be removed.

A typical related art method of fabricating a display device does not include both the tasks of: strengthening a glass substrate and slimming the glass substrate. In a case in which only the strengthening task was included, shattering or cracks may occur when bending the strengthened glass substrate due to compressive stress of the surface of the glass substrate that was generated during the strengthening of the glass substrate. Also, since the slimming task was not included, it may be difficult to provide a display device including a thin glass substrate. Furthermore, in a case in which only the slimming task was included, since the glass substrate was not strengthened, shattering or cracks of the glass substrate may occur in the slimming task or during bending.

Since the method of fabricating a display device according to an embodiment of the present disclosure may include both the strengthening task and the slimming task of the glass substrate, the method may provide a display device including a thin glass substrate capable of protecting (or protecting from) the occurrence of shattering or cracks during bending.

According to a method of fabricating strengthened glass according to an embodiment of the present disclosure, the occurrence of shattering and cracks during bending may be reduced.

According to a method of fabricating a display device according to an embodiment of the present disclosure, the occurrence of shattering and cracks during bending may be reduced.

Although preferred embodiments of the present disclosure have been shown and described with reference to the accompanying drawings, it will be understood by those of ordinary skill in the art that various changes in form and details may be made therein without departing from the spirit and scope of the invention as defined by the following claims and equivalent thereof. Accordingly, it is to be understood that the embodiments of the present disclosure have been described by way of illustration and not limitation.

What is claimed is:

1. A method of fabricating a display device, the method comprising:
   providing strengthened glass;
   providing a display panel; and
   bending the strengthened glass and the display panel;
   wherein the providing of the strengthened glass comprises:
      strengthening a glass substrate to form a strengthened glass substrate; and
      slimming a first surface of the strengthened glass substrate to reduce a thickness of the strengthened glass substrate and not slimming a second surface of the strengthened glass substrate opposite to the first surface, or slimming the first surface by a greater extent than the second surface,
   wherein the providing the display panel comprises providing the display panel to be closer to the first surface than the second surface,
   wherein the strengthening equally increases the compressive stresses of the first and second surfaces of the strengthened glass substrate and the slimming differentially reduces the compressive stresses of the first and second surfaces of the strengthened glass substrate,
   wherein, after the slimming the strengthened glass substrate, the first surface has a compressive stress of about 100 MPa to about 700 MPa and the second surface has a compressive stress of about 700 MPa to about 1,000 MPa, and the compressive stress of the second surface is greater than the compressive stress of the first surface,
   wherein, the display panel is an organic light emitting display panel or a liquid crystal display panel,
   wherein, in the bending, the first surface has a first radius of curvature, and the second surface has a second radius of curvature greater than the first radius of curvature, and
   wherein, in the bending, a distance along a first direction between portions of the first surface bent to face each other is greater than a distance along the first direction between portions of the display panel bent to face each other, and
   wherein the first direction is a thickness direction of each of the strengthened glass and the display panel.

2. The method of claim 1, further comprising providing a touch screen panel to be closer to the first surface than the second surface, and
   wherein the display panel is provided between the strengthened glass and the touch screen panel.

3. The method of claim 2, wherein the bending the strengthened glass and the display panel comprises bending the strengthened glass, the display panel, and the touch screen panel.

4. The method of claim 1, wherein the slimming is performed by mechanical polishing or chemical polishing.

5. The method of claim 1, wherein the strengthening is performed by a chemical strengthening method.

* * * * *